United States Patent
Yoshitake et al.

(10) Patent No.: US 7,271,233 B2
(45) Date of Patent: Sep. 18, 2007

(54) ROOM-TEMPERATURE-CURABLE SILICONE RUBBER COMPOSITION

(75) Inventors: Makoto Yoshitake, Chiba (JP); Kazutoshi Okabe, Chiba (JP); Yukinari Harimoto, Kanagawa (JP)

(73) Assignees: Dow Corning Toray Silicone Co., Ltd., Tokyo (JP); Dow Corning Asia Limited, Tokyo (JP)

( * ) Notice: Subject to any disclaimer, the term of this patent is extended or adjusted under 35 U.S.C. 154(b) by 78 days.

(21) Appl. No.: 10/477,156

(22) PCT Filed: May 25, 2002

(86) PCT No.: PCT/JP02/05247
§ 371 (c)(1), (2), (4) Date: Nov. 7, 2003

(87) PCT Pub. No.: WO02/096993
PCT Pub. Date: Dec. 5, 2002

(65) Prior Publication Data
US 2004/0176528 A1    Sep. 9, 2004

(30) Foreign Application Priority Data
May 30, 2001  (JP) ............................ 2001-161703
May 30, 2001  (JP) ............................ 2001-161704

(51) Int. Cl.
*C08G 77/08* (2006.01)
(52) U.S. Cl. .......................................... 528/18; 528/34
(58) Field of Classification Search ................. 528/18, 528/34
See application file for complete search history.

(56) References Cited

U.S. PATENT DOCUMENTS

| | | | | |
|---|---|---|---|---|
| 3,542,901 A * | 11/1970 | Cooper et al. | ................. | 528/33 |
| 4,670,532 A * | 6/1987 | Lucas | ........................... | 528/18 |
| 5,340,899 A * | 8/1994 | Altes | ........................... | 528/34 |
| 5,357,025 A * | 10/1994 | Altes et al. | ................... | 528/42 |
| 5,373,079 A * | 12/1994 | Altes | ........................... | 528/34 |
| 6,037,434 A * | 3/2000 | De Buyl et al. | .............. | 528/34 |
| 6,265,518 B1 * | 7/2001 | Krahnke et al. | .............. | 528/31 |
| 6,288,152 B1 * | 9/2001 | Okabe et al. | ................ | 524/205 |

* cited by examiner

Primary Examiner—Margaret G. Moore
(74) Attorney, Agent, or Firm—Howard & Howard Attorneys, P.C.

(57) ABSTRACT

A room-temperature-curable silicone rubber composition comprising (A) 100 parts by weight of a polydiorganosiloxan mixture comprising: (A-1) 20 to 95 wt. % of a polydiorganosiloxane having both molecular terminals capped with dialkoxysilyl groups or trialkoxysilyl groups, (A-2) 5 to 80 wt. % of a polydiorganosiloxane having a molecular terminal capped with dialkoxysilyl group or trialkoxysilyl group and the other molecular terminal capped with monoalkoxysilyl group, hydrosilyl group, trialkylsilyl group or trialkoxyalkylsilyl group, and (A-3) 0 to 30 wt. % of a polydiorganosiloxane having both molecular terminals capped with monoalkoxysilyl group, hydlosilyl group, trialkylsilyl group or trialkoxyalkylsilyl group, (B) one or more alkoxysilanes of the formula $R5bSi(OR6)_{4-b}$ or partial hydrolysis and condensation products thereof, and (C) an organotitanium compound. The composition is used as a sealant.

16 Claims, No Drawings

ROOM-TEMPERATURE-CURABLE SILICONE RUBBER COMPOSITION

The present invention relates to a room-temperature-curable silicone rubber composition, in particular, to a room-temperature-curable silicone rubber composition which, after curing, acquires an appropriate modulus of elasticity and is characterized by improved adhesive properties, such as bonding durability and long outdoor service life.

Known in the art are many room-temperature-curable silicone rubber compositions, which can be cured at room temperature by contact with the moisture of the air. Among these, the composition which has main components in the form of an alkoxysilane and a polydiorganosiloxane having both molecular terminals capped with alkoxysilyl groups and which is cured in the presence of an organotitanium catalyst by removing alcohol (the so-called de-alcoholation-type room-temperature-curable silicone rubber composition) finds wide applications ranging from a sealing composition for electronic and electrical devices to adhesives and construction sealants (see, eg, Japanese Patent Publication Kokoku) S39-27643 (equivalent to GB962061), Japanese Patent Application Publication (hereinafter referred to as Kokai) S55-43119 (equivalent to US4111890) and Kokai S62-252456). However, compositions of the aforementioned type have poor adhesion to substrates, and in particular low bonding durability. Since with the lapse of time after long outdoor use adhesive joints obtained with the use of the above compositions lose their adhesive strength, the aforementioned compositions are unsuitable for use as construction sealants.

Japanese Patent No 2,550,749 previously published as Kokai H04-13767 describes a curable silicone composition, characterized by containing the following component (I) and/or component (II), component (III), and a curing catalyst wherein (I) is a diorganopolysiloxane expressed by the following general formula:

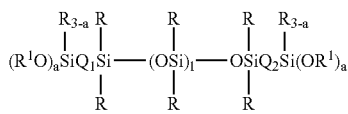

(where R is a $C_1$ to $C_8$ substituted or unsubstituted monovalent hydrocarbon group, $R^1$ is a $C_1$ to $C_4$ alkyl group or alkoxy-substituted alkyl group, $Q_1$ and $Q_2$ are each a $C_1$ to $C_8$ divalent hydrocarbon group or an oxygen atom, a is 2 or 3, and 1 is an integer from 5 to 3000) (II) is a diorganopolysiloxane expressed by the following general formula:

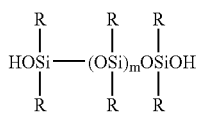

(where R is defined the same as above, and m is an integer from 5 to 3000); and (III) is a diorganopolysiloxane expressed by the following general formula:

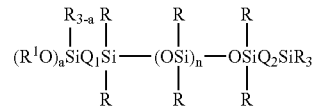

(where R, $R^1$, $Q_1$, $Q_2$, and a are defined the same as above, and n is an integer that results in a viscosity at 25° C. of at least 800 cp, and the upper limit thereof is 3000).

It is an object of the present invention to provide a room-temperature-curable silicone rubber composition which after curing is turned into a silicone rubber with an appropriate modulus of elasticity, which demonstrates good adherence to a substrate brought into contact with the composition during curing, and which is characterized by excellent bonding durability along with long outdoor service life.

The present invention relates to a room-temperature-curable silicone rubber composition comprising
(A) 100 parts by weight of a mixture comprising
    (A-1) 20 to 95 wt. % of a polydiorganosiloxane represented by the general formula (1)

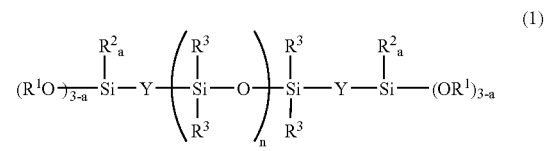

(A-2) 5 to 80 wt. % of a polydiorganosiloxane represented by the general formula (2)

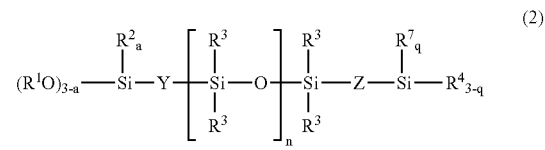

and
    (A-3) 0 to 30 wt. % of a polydiorganosiloxane represented by the general formula (3)

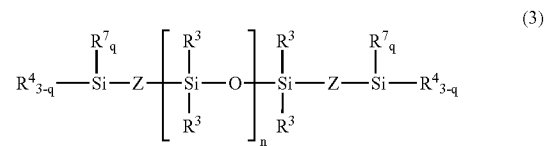

where $R^1$ and $R^2$ are alkyl groups or alkoxyalkyl groups, $R^3$ is selected from the group consisting of monovalent hydrocarbon group, halogenated hydrocarbon group, and cyanoalkyl group, $R^4$ is —OSi $R^2_3$, hydrogen or an alkoxy group, $R^7$ is $R^2$ or $R^3$, each Y and Z is oxygen or a divalent hydrocarbon group, a is 0 or 1, q is 0, 1 or 2, and n is a number that provides the respective polydiorganosiloxane with a viscosity within the range of 20 to 1,000,000 mPa·s at 25° C.; selected from the group of compounds wherein:— when R⁴ is —OSi R²₃, Y is oxygen or a divalent hydrocarbon group, Z is a divalent hydrocarbon group, R⁷ is R² and q is 0, 1 or 2; and when R⁴ is hydrogen or an alkoxy group, Y is oxygen or an alkoxy group, Z is oxygen or a divalent hydrocarbon group, q is 2 and R⁷ is R³;

(B) 1 to 25 parts by weight of one or more alkoxysilane or partial hydrolysis and condensation products thereof having the general formula $R^5{}_b Si(OR^6)_{4-b}$ where R⁵ is a monovalent hydrocarbon group, R⁶ is an alkyl group or an alkoxy alkyl group, and b is 0 or 1; and (C) 0.5 to 10 parts by weight of an organotitanium compound.

Referring to component A, preferably each R¹ may be the same or different and each R² may be the same or different and each R¹ and R² is an alkyl group or alkoxyalkyl group. The alkyl groups may be represented by, for example, a methyl, ethyl, propyl, isopropyl and butyl. Alkoxyalkyl groups can be represented by methoxyethyl, ethoxyethyl, methoxypropyl, and methoxybutyl.

Preferably each R³ may be the same or different and may be selected from monovalent hydrocarbon groups, such as alkyl groups, for example, methyl, ethyl, propyl, and butyl, cycloalkyl groups, for example, cyclopentyl, cyclohexyl, alkenyl groups, for example, vinyl and allyl, aryl groups, for example, phenyl, tolyl and naphthyl, and aralkyl groups, for example, benzyl, phenylethyl and phenylpropyl halogenated hydrocarbon groups, and cyanoalkyl groups. R³ may alternatively comprise halogenated hydrocarbon groups exemplified by chloromethyl, trifluoropropyl, and chloropropyl or cyanoalkyl groups exemplified by β-cyanoethyl and a γ-cyanopropyl. Most preferable among the above are methyl and ethyl groups.

Each R⁴ may be the same or different and is —OSi R²₃, hydrogen or an alkoxy group. The alkoxy group may be represented by, for example, methoxy, ethoxy, or propoxy group.

As hereinbefore described R⁷ may be R² or R³.

Subject to the above restrictions, each Y and each Z may be the same or different and is either oxygen or a divalent hydrocarbon group, preferably an alkylene group such as methylene, ethylene, propylene, or butylene, but is most preferably a methylene or ethylene group; a is 0 or 1, and n is a number such that at 25° C. the polydiorganosiloxane will have a viscosity within the range of 20 to 1,000,000 mPa·s, more preferably in the range of 50 to 500,000 mPa·s, and most preferably in the range of 1,000 to 100,000 mPa·s. Preferably n is an integer between 5 and 10 000.

(A-1) is a polydiorganosiloxane as shown in the general formula (1) having terminal groups comprising two or three silicon-bonded alkoxy groups or alkoxyalkoxy groups. A variety of preparative methods for producing (A-1) are known. For example, it can be produced by the following methods:

i) effecting an addition reaction between a polydiorganosiloxane having both molecular terminals capped with hydrosilyl groups and an alkenyltrialkoxysilane or an alkenylalkyldialkoxysilane;

ii) causing an addition reaction between a polydiorganosiloxane having both molecular terminals capped with alkenylsilyl groups and a trialkoxysilane or an alkyldialkoxysilane; or iii) causing a de-alcoholation and condensation reaction between a polydiorganosiloxane having both molecular terminals capped with hydroxysilyl groups and a tetraalkoxysilane or an alkyltrialkoxysilane It is preferred to use substituent (A-1) of component (A) in an amount of 20 to 95 wt. %.

Subject to the restrictions above, (A-2) is a polydiorganosiloxane that may have on one molecular terminal two or three silicon-bonded alkoxy groups or alkoxyalkyl groups and on the other molecular terminal —OSi R²₃, silicon-bonded hydrogen atom or silicon-bonded alkoxy group and is used for decreasing, to an appropriate degree, the modulus of elasticity of the cured body obtained from the present silicone rubber composition. Along with adjustment of the modulus, this substituent can also increase bonding durability.

When R⁴ is —OSi R²₃, Y is oxygen or a divalent hydrocarbon group, Z is a divalent hydrocarbon group, R⁷ is R² and q is 0, 1 or 2, (A-2) may be prepared by the following methods:

i) effecting an addition reaction between a polydiorganosiloxane which has on one terminal a siloxane-containing group expressed by the general formula (4)

(4)

where R², Z, and b are the same as defined above, and on the other terminals hydrosilyl groups, and an alkenyltrialkoxysilane or an alkenylalkyldialkoxysilane;

ii) causing an addition reaction between a polydiorganosiloxane, which has on one molecular terminal a siloxane-containing group described by the previous formula and on the other terminal an alkenylsilyl group, and a trialkoxysilane or an alkyldialkoxysilane; or iii) causing a de-alcoholation and condensation reaction between a polydiorganosiloxane which has on one molecular terminal a siloxane-containing group described by the previous formula and on the other terminal a hydroxysilyl and a tetraalkoxysilane or an alkyltrialkoxysilane.

The raw material used for the aforementioned reactions, ie, polydiorganosiloxanes having on one terminal a siloxane-containing group can be produced, eg, by ring-opening polymerization with the use of a ring-opening agent such as hexamethylcyclotrisiloxane of the following formula: {(CH₃)₃SiO}₃SiC₂H₄Li and with subsequent neutralization with dimethylchlorosilane, an alkenyldimethylchlorosilane, or a carboxylic acid, respectively.

When R⁴ is hydrogen or an alkoxy group, Y is oxygen or a divalent hydrocarbon group, Z is oxygen or a divalent hydrocarbon group, q is 2 and R⁷ is R³, (A-2) may be prepared by the following methods:

i) causing an addition reaction between a polydiorganosiloxane, which has on one terminal a monoalkoxysilyl group and on the other terminals a hydrosilyl groups, and an alkenyltrialkoxysilane or an alkenylalkyldialkoxysilane;

ii) causing an addition reaction between a polydiorganosiloxane, which has on one molecular terminal a monoalkoxysilyl group and on the other terminal a vinylsilyl group, and a trialkoxysilane or an alkyldialkoxysilane;

iii) causing a de-alcoholation and condensation reaction between a polydiorganosiloxane, which has on one molecular terminal a monoalkoxysilyl group and on the other terminal a silanol group, and a tetraalkoxysilane or an alkyltrialkoxysilane.

The raw material used for the aforementioned reactions, ie, polydiorganosiloxanes having on one terminal a hydrosilyl group, vinylsilyl group, or a silanol group, can be produced, for example, by ring-opening polymerization with the use of a ring-opening agent such as a dialkylalkoxysiloxylithium with subsequent neutralization with a dialkylchlorosilane, an alkenyldialkylchlorosilane, or a carboxylic acid, respectively. It is recommended to use substituent (A-2) of component (A) in an amount of 5 to 80 wt. %.

(A-3) can be added when required. This substituent can be used for decreasing the modulus of elasticity of the cured body obtained from the present silicone rubber composition. When $R^4$ is $—OSi\ R^2_3$, Y is oxygen or a divalent hydrocarbon group, Z is a divalent hydrocarbon group, $R^7$ is $R^2$ and q is 0, 1 or 2, (A-3) may be prepared by the following methods known in the art: eg, by causing an addition reaction between a polydiorganosiloxane having both molecular terminals capped with hydrosilyl groups and vinyltris(trimethylsiloxy) silane, vinyldimethyl(trimethylsiloxy)silane, or a similar alkenylsiloxane; or by causing an addition reaction between a polydiorganosiloxane having both molecular terminals capped with alkenylsilyl groups and tris(trimethylsiloxy)silane or dimethyl (trimethylsiloxy) silane, or a similar hydrosiloxane.

When $R^4$ is hydrogen or an alkoxy group, Y is oxygen or a divalent hydrocarbon group, Z is oxygen or a divalent hydrocarbon group, q is 2 and $R^7$ is $R^3$, the alkoxy group containing (A-3) may be prepared by the following methods: by causing an addition reaction between a polydiorganosiloxane, which has both molecular terminals capped with vinylsilyl groups, and an alkylalkoxysilane; by causing a de-alcoholation and condensation reaction between a polydiorganosiloxane, which has both molecular terminals capped with silanol groups, and a dialkyldialkoxysilane; or by causing a dehydration and condensation reaction between a polydiorganosiloxane, which has both molecular terminals capped with hydrosilyl groups and an alcohol. It is preferred to use substituent (A-3) of component (A) in an amount of 0.5 to 15 wt. %.

Component (B) is a cross-linking agent for component (A). It is an alkoxysilane of the following formula: $R^5_bSi(OR^6)_{4-b}$, or a product of its partial hydrolyzation and condensation. In the above formula, each $R^5$ may be the same or different and is a monovalent hydrocarbon group, for example an alkyl group such as methyl, ethyl, propyl, isopropyl and butyl; an alkenyl group such as vinyl, allyl or hexenyl; or a phenyl group; $R^1$ is an alkyl group such as methyl, ethyl, propyl, butyl or an alkoxyalkyl group such as methoxyethyl, ethoxyethyl, methoxypropyl, and methoxybutyl; b is 0 or 1. A product of partial hydrolyzation and condensation of an alkoxysilane is obtained by adding water to the aforementioned alkoxysilane and hydrolyzing the mixture. The following are preferred examples of component (B): trifunctional alkoxysilanes such as methyltrimethoxysilane, methyltriethoxysilane, ethyltnimethoxysilane, vinyltrimethoxysilane, phenyltrimethoxysilane and methyltrimethoxyethoxysilane; and tetrafunctional alkoxysilanes such as tetramethoxysilane and tetraethoxysilane, or products of partial hydrolyzation and condensation of the above compounds. The aforementioned component (B) can be used independently or in a mixture of two or more. It is recommended to use component (B) in an amount of 1 to 25 parts by weight, preferably 2 to 10 parts by weight, for each 100 parts by weight of component (A). If component (B) is used in a smaller amount, the composition will not be sufficiently cured and will be subject to thickening and gelation in storage. If, on the other hand, component (B) is used in an excessive amount, this will delay curing and increase the cost of the product.

An organotitanium compound (C) is a catalyst for curing the present composition. Any suitable organotitanium compound may be utilised such as, for example a titanium acid ester such as tetra(i-propoxy) titanium, tetra(n-butoxy) titanium and tetra(t-butoxy) titanium; or titanium chelates such as di-(sopropoxy) bis(ethylacetate) titanium, di-(i-propoxy) bis(methylacetate) titanium, di-(i-propoxy) bis(acetylacetone) titanium. It is recommended to use component (C) in an amount of 0.5 to 10 parts by weight, preferably 1 to 5 parts by weight, for each 100 parts by weight of component (A). If it is used in a smaller amount, curing of the present composition will be delayed. If, on the other hand, component (C) is used in an excessive amount, this will impair storage stability of the composition and increase the cost of the product.

The present composition is prepared using components (A), (B) and (C). If necessary, however, for thickening of the composition and for increasing of mechanical strength of the silicone rubber after curing, the composition can be additionally combined with a reinforcement filler in the form of (D) a fine silica powder. Normally, fine silica powder (D) has a BET specific surface area of at least 50 $m^2/g$. This component can be represented by a so-called wet-process fine-powdered silica such as precipitated silica and by a so-called dry-process fine-powdered silica such as fumed silica; or a hydrophobically surface-treated silica obtained by treating surfaces of the aforementioned silicas with hydrophobic agents, such as hexamethyldisilazane, tetramethyldivinyldisilazane, dimethyldichlorosilane, trimethylchlorosilane, trimethylsilanol, methylhydrogenpolysiloxane, octamethylcyclotetrasiloxane, and silanol-capped dimethylsiloxane oligomer. Among these, preferable are dry-process fine silica powder and hydrophobically surface-treated dry-process fine silica powder. Component (D) is normally used in amount of 1 to 20 parts by weight for each 100 parts of component (A).

In order to improve adhesion of the present composition to a substrate at the time of curing, the composition may incorporate an adhesion promoter as component (E). The following are examples of such adhesion promoters: amino-containing organoalkoxysilanes such as γ-aminopropyltrimethoxysilane and γ-(2-aminoethyl) aminopropyltrimethoxysilane, an epoxy-containing organoalkoxysilane such as γ-glycidoxypropyltrimethoxysilane, a mercapto-containing organoalkoxysilane such as γ-mercaptopropyltrimethoxysilane, and a reaction mixture of an amino-containing organoalkoxysilane and an epoxy-containing organoalkoxysilane. Most preferable among the above are an amino-containing organoalkoxysilane and an epoxy-containing organoalkoxysilane. It is recommended to use component (E) in an amount of 0.1 to 5 parts by weight for each 100 parts by weight of component (A).

In order to improve bonding durability of the composition to a substrate formed as a result of curing, the composition may incorporate a light stabilizer (F). Component (F) can be represented by a hindered amine. The following are examples of such hindered amines: Adekastab LA-52, Adekastab LA-57, Adekastab LA-62, Adekastab LA-67, LA-77, Adekastab LA-63P, and Adekastab LA-68LD (trademarks of Asahi Denka Kogyo K.K.), and CHIMASSORB 944 and CHIMASSORB 119 (trademarks of Ciba Specialty Chemicals K.K.). This component can be used in an amount of 0.1 to 5 parts by weight for each 100 parts of component (A).

In order to lower the modulus of elasticity in silicone rubber obtained after curing, within limits not contradictory to the purposes of the invention, the composition of the present invention may be combined with such additives as bifunctional alkoxysilanes such as dimethyldimethoxysilane and diphenyldimethoxysilane, or conventional modulus-control agents such as a polydimethylsiloxane having both molecular terminals capped with trimethylsiloxy groups, a dimethylsiloxane oligomer having both molecular terminals capped with trimethylsiloxy groups. The composition may incorporate other known additives, such as organic solvents, anticorrosive agents, flame retardants, heat-resistant agents, plasticizers, thixotropic agents, curing accelerators, pigments, non-reinforcing fillers such as calcium carbonate powder, the aforementioned calcium carbonate powder surface can be treated with a resin acid, higher fatty acid, or the like; diatomaceous earth powder, titanium dioxide, aluminum hydroxide powder, alumina powder, magnesium oxide powder, zinc oxide powder, zinc carbonate powder, or the aforementioned powders surface treated with organoalkoxysilanes, hexaorganodisilazanes, organosiloxane oligomers, or with other hydrophobic substances, provided the use of these fillers is not in contradiction with the purposes of the invention.

The present composition can be easily prepared by uniformly mixing components (A), (B) and optionally (C), and, where required, one or more of the various optional additives discussed above. The resulting composition is sealed in a container under conditions isolated from humid air. When the composition is required for use, it is removed from the container and cured into a resilient silicone rubber by exposure to moisture from air.

After curing at room temperature, the present composition is turned into a silicone rubber which has an appropriate modulus of elasticity, exhibits excellent adhesion to substrates, is suitable for long-term outdoor exposure, and can maintain a strong adhesive force over a long period of time. The composition is highly effective when used in applications for which this characteristic is required, including building material sealant, and especially construction material sealant that is applied to glass and other optically transparent materials.

Hence as herein before described when each $R^4$ is hydrogen or an alkoxy group, Y is oxygen or a divalent hydrocarbon group, Z is oxygen or a divalent hydrocarbon group, q is 2 and $R^7$ is $R^3$; Component (A) can be easily prepared by uniformly mixing (A-1) and (A-2) or (A-1), (A-2), and (A-3) in an each required amount or can be synthesized as a mixture of (A-1), (A-2), and (A-3) in an arbitrary sequence.

For instance, a polydiorganosiloxane mixture (I) consisting of 81 weight % of a polydiorganosiloxane represented by the chemical formula (5),

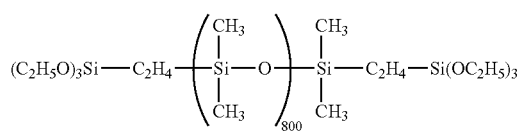
(5)

18 weight % of a polydiorganosiloxane represented by the chemical formula (6),

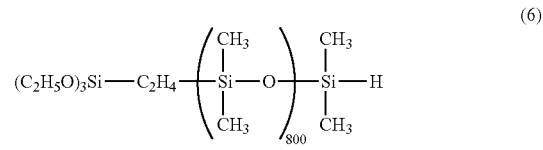
(6)

and 1 weight % of a polydiorganosiloxane represented by the chemical formula (7),

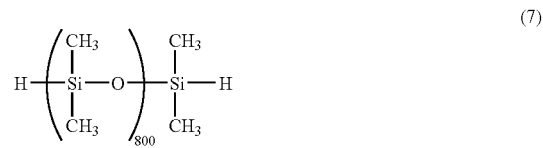
(7)

may be synthesized by reacting vinyltriethoxysilane with a hydrosilyl-capped polydiorganosiloxane represented by the chemical formula (7) in an amount equivalent to 0.9 relative to the hydrosilyl groups of the aforementioned polydiorganosiloxane in the presence of a hydrosilylation catalyst.

Furthermore, a polydiorganosiloxane mixture (II) consisting of 81 weight % of a polydiorganosiloxane represented by the chemical formula (9),

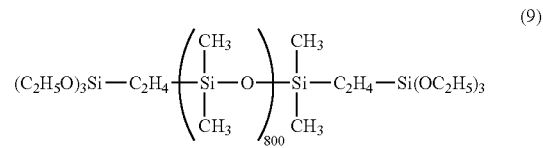
(9)

18 weight % of a polydiorganosiloxane represented by the chemical formula (10),

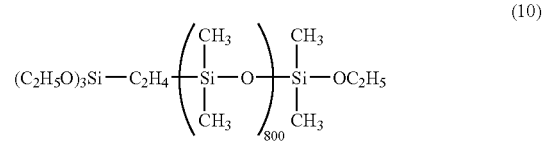
(10)

and 1 weight % of a polydiorganosiloxane represented by the chemical formula (11),

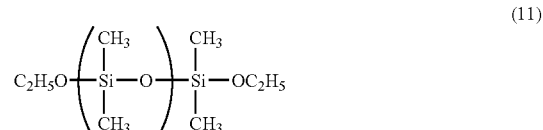
(11)

can be synthesized by reacting ethanol with the aforementioned polydiorganosiloxane mixture (I) in the presence of a dehydration and condensation catalyst, thus converting hydrosilyl groups into ethoxysilyl groups.

Furthermore, a polydiorganosiloxane mixture (III) consisting of 64 weight % of a polydiorganosiloxane represented by the chemical formula (12),

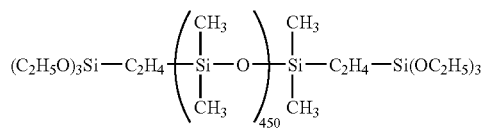
(12)

32 weight % of a polydiorganosiloxane represented by the chemical formula (13),

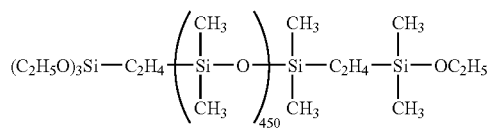
(13)

and 4 weight % of a polydiorganosiloxane represented by the chemical formula (14),

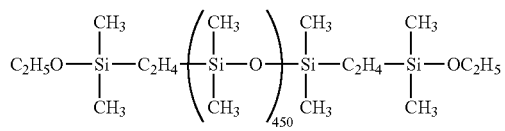
(14)

can be synthesized by reacting vinyltriethoxysilane {$CH_2=CH—Si(OC_2H_5)_3$} and dimethylvinylethoxysilane {$CH_2=CH—Si(CH_3)_2(OC_2H_5)$} with a polydiorganosiloxane represented by the chemical formula (15),

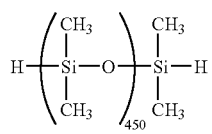
(15)

in an amount equivalent, respectively to 0.8 and 0.2 relative to the hydrosilyl groups of the polyorganosiloxane in the presence of a hydrosilylation catalyst.

Furthermore, synthesis can be carried out by reacting a triethoxysilane {$H—Si(OC_2H_5)_3$} and dimethylethoxysilane {$H—Si(CH_3)_2(OC_2H_5)$} with a polydiorganosiloxane represented by the chemical formula (16),

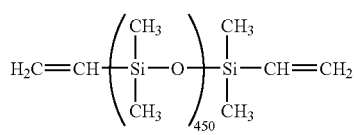
(16)

in an amount equivalent respectively to 0.8 and 0.2 relative to the vinlsilyl groups of the polyorganosiloxane in the presence of a hydrosilylation catalyst.

Furthermore, a polydiorganosiloxane mixture (IV) consisting of 49 weight % of a polydiorganosiloxane represented by the chemical formula (17),

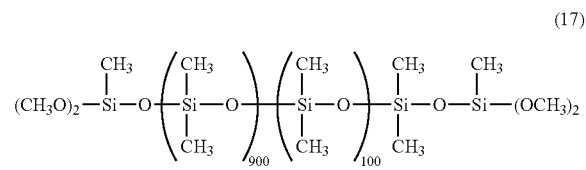
(17)

42 weight % of a polydiorganosiloxane represented by the chemical formula (18),

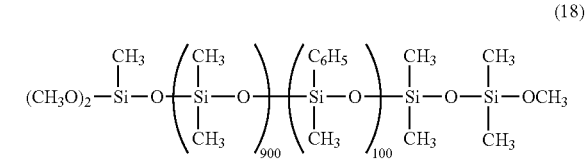
(18)

and 9 weight % of a polydiorganosiloxane represented by chemical formula (19),

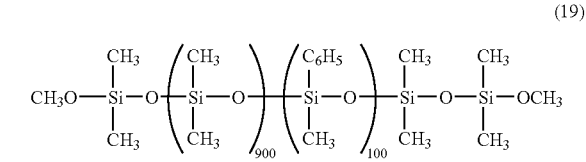
(19)

can be synthesized by reacting methyltrimethoxysilane {$CH_3—Si(OCH_3)_3$} and dimethyldimethoxysilane {$(CH_3)_2—Si(OCH_3)_2$} with a polydiorganosiloxane represented by the chemical formula (20),

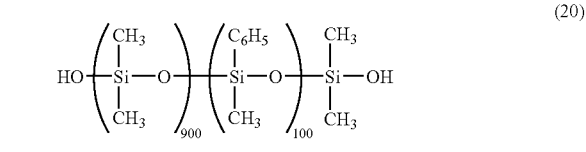
(20)

having both molecular terminals capped with hydroxysilyl groups in an amount equivalent respectively to 0.7 and 0.3 relative to the hydroxysilyl groups of the polyorganosiloxane in the presence of a de-methanolization catalyst.

In the second embodiment of the invention when $R^4$ is —$OSi\ R^2_3$, Y is oxygen or a divalent hydrocarbon group, Z is a divalent hydrocarbon group, $R^7$ is $R^2$ and q is 0, 1 or 2; Component (A) can be easily prepared by uniformly mixing (A-1) and (A-2) or (A-1), (A-2), and (A-3) in an each required amount or can be synthesized as a mixture of (A-1), (A-2), and (A-3) in an arbitrary sequence.

For instance, a polydiorganosiloxane mixture (V) consisting of 81 wt. % of a polydiorganosiloxane represented by the chemical formula (21),

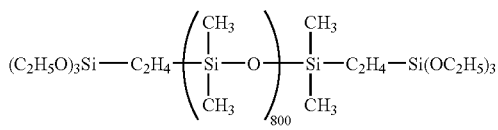

(21)

18 wt. % of a polydiorganosiloxane represented by the chemical formula (22),

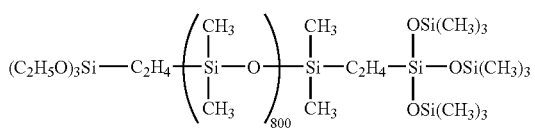

(22)

and 1 wt. % of a polydiorganosiloxane represented by the chemical formula (23),

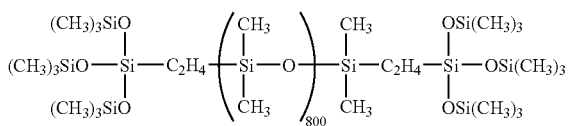

(23)

can be synthesized by reacting a polydiorganosiloxane expressed by the chemical formula (24) and having both molecular terminals capped with hydrosilyl groups,

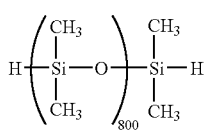

(24)

with vinyltriethoxysilane {CH$_2$=CH—Si(OC$_2$H$_5$)$_3$} and vinyltris (trimethylsiloxysilane) {CH$_2$=CH—Si(OSi (CH$_3$)$_3$)$_3$} in an amount equivalent respectively to 0.9 and 0.1 relative to the hydrosilyl groups of the aforementioned polydiorganosiloxane and in the presence of a hydrosilylation catalyst.

Furthermore, synthesis can be carried out by reacting a polydiorganosiloxane which is represented by the chemical formula (25) and has both molecular terminals capped with vinylsilyl groups,

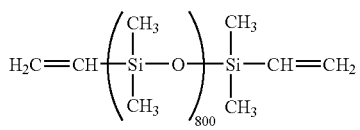

(25)

with triethoxysilane {H—Si(OC$_2$H$_5$)$_3$} and trimethylsiloxysilane {H—Si{OSi(CH$_3$)$_3$}$_3$} in an amount equivalent respectively to 0.9 and 0.1 relative to the aforementioned vinylsilyl groups and in the presence of a hydrosilylation catalyst.

A polydiorganosiloxane mixture (VI) consisting of 49 wt. % of a polydiorganosiloxane represented by the chemical formula(26),

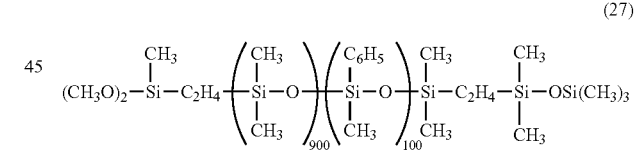

(26)

42 wt. % of a polydiorganosiloxane represented by the chemical formula (27), (27)

and 9 wt. % of a polydiorganosiloxane represented by the chemical formula (28),

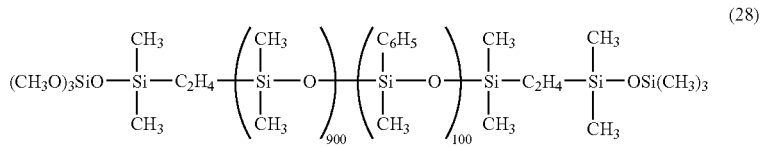

(28)

can be synthesized by reacting a polydiorganosiloxane represented by the chemical formula (29) and having both molecular terminals capped with hydrosilyl groups

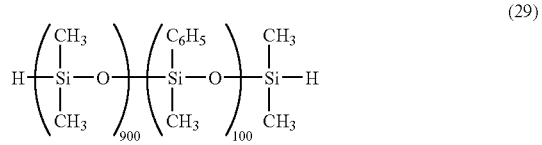
(29)

with methylvinyldimethoxysilane {CH$_2$=CH—Si(CH$_3$)(OCH$_3$)$_2$} and dimethylvinyl(trimethylsiloxy)silane {CH$_2$=CH—Si(CH$_3$)$_2${OSi(CH$_3$)$_3$}} in an amount equivalent respectively to 0.7 and 0.3 relative to the aforementioned hydrosilyl groups and in the presence of a hydrosilylation catalyst.

Furthermore, synthesis can be carried out by reacting a polydiorganosiloxane, which is represented by the chemical formula (30)

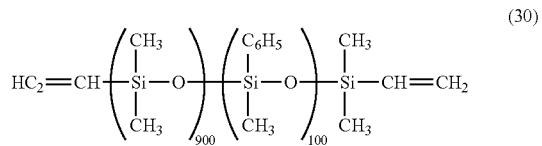
(30)

and which has both molecular terminals capped with vinylsilyl groups, with methyldimethoxysilane {H—Si(CH$_3$)(OCH$_3$)$_2$} and dimethyl(trimethylsiloxy)silane {H—Si(CH$_3$)$_2${OSi(CH$_3$)$_3$}} in an amount equivalent respectively to 0.7 and 0.3 relative to the aforementioned vinylsilyl groups and in the presence of a hydrosilylation catalyst.

The invention will be further described in detail with reference to Examples. In these example, all viscosity values were measured at 25° C. The following methods were used for measuring initial adhesive force and bonding durability of the room-temperature-curable composition of the invention.

Bonding Durability of Room-Temperature-Curable Silicone Rubber Composition

A test piece for testing bonding durability was prepared according to the method set forth in JIS A 1439 that specifies construction material sealant test methods. Referring to FIG. 1 of this industrial standard, a bonding durability test piece (also referred to as a "type H test piece"), was prepared by sandwiching a room-temperature-curable silicone rubber composition between two float glass plates (as defined under JIS R3202). Subsequently, the room-temperature-curable silicone rubber composition was cured by holding it in quiescence for 28 days at 23° C. and 50% humidity. After that, bonding durability test pieces thus obtained were subjected to a stretching strength test according to JIS A 1439. After the test the silicone rubber was observed for breakage (evaluation of initial adhesion).

The test pieces prepared for testing bonding durability of adhesive joint were placed in a fluorescent UV light accelerated exposure test apparatus (commercial name UVCON UC-1 made by Atlas Co., Ltd.). According to ASTM G154, the bonding durability test pieces were irradiated with UV rays across a glass plate by using a UVA-340 fluorescent lamp. Following the UV irradiation, bonding durability test pieces were removed after 1,000 hours, 2,000 hours, 3,000 hours, and 5,000 hours. They were subjected to stretching tests based on JIS A1439, and the state of the silicone rubber breakage was observed (evaluation of bonding durability).

The results were noted as follows:

○: Breakage at the silicone rubber layer (cohesive failure rate: 100%)

Δ: Partial boundary peeling (cohesive failure rate: 50-99%)

X: Boundary peeling (cohesive failure rate: 0-49%).

Examples are now provided in relation to a embodiment of the invention wherein when $R^4$ is hydrogen or an alkoxy group, Y is oxygen or a divalent hydrocarbon group, Z is oxygen or a divalent hydrocarbon group, $R^7$ is $R^3$ and q is 2.

SYNTHESIS EXAMPLE 1

Polydiorganosiloxane Mixture (I)

A flask equipped with a stirrer was filled with 500 g of a polydimethylsiloxane of the chemical formula having both molecular terminals capped with hydrosilyl groups and with 2.88 g of vinyltriethoxysilane {CH$_2$=CH—Si(OC$_2$H$_5$)$_3$}. The components were uniformly mixed. After the mixture was combined with 39 mg of a 10% toluene solution of a complex of platinum and 1,3-divinyl-1,1,3,3-tetramethyldisiloxane, it was stirred in the container while being heated to 100° C. After stirring at 100° C. for 1 hour, the pressure in the flask was reduced to 10 Torr, and the mixture was stirred for additional 30 min. The mixture was then cooled to room temperature, the pressure was restored to atmospheric pressure, and the obtained viscous oily product was removed from the flask. Results of $^{29}$Si-NMR spectral analysis confirmed that the obtained product comprised polydiorganosiloxane mixture (I) consisting of 81 weight % of a polydimethylsiloxane of the chemical formula (5), 18 weight % of a polydimethylsiloxane of the chemical formula (6), and 1 weight % of a polydimethylsiloxane of the chemical formula (7). The resulting polydiorganosiloxane mixture (I) had a viscosity of 60,000 mPa·s.

SYNTHESIS EXAMPLE 2

Polydiorganosiloxane Mixture (II)

A flask equipped with a stirrer was filled with 200 g of a polydimethylsiloxane obtained in Synthesis Example 1, with 3.88 g of ethanol, and with 200 g of toluene. The components were uniformly mixed. While the mixture was stirred, 5 g of palladium carbonate were added, and the mixture was heated to 100° C. After stirring at 100° C. for 1 hour, the mixture was cooled to room temperature, the liquid obtained in the flask was filtered out, and the palladium carbonate was removed. The obtained filtrate was poured into a flask, concentrated under vacuum in a rotary evaporator, and the excess of ethanol and toluene was completely removed. After cooling, the obtained viscous oily product was removed from the flask. Results of $^{29}$Si-NMR spectral analysis confirmed that the obtained product comprised polydiorganosiloxane mixture (II) consisting of 81 weight % of a polydimethylsiloxane of the chemical formula (9), 18 weight % of a polydimethylsiloxane of the chemical formula (10), and 1 weight % of a polydimethylsiloxane of the chemical formula (11). The obtained polydiorganosiloxane mixture (II) had a viscosity of 60,000 mPa·s.

SYNTHESIS EXAMPLE 3

Polydiorganosiloxane Mixture (III)

A flask equipped with a stirrer was filled with 500 g of a polydimethylsiloxane of the chemical formula (15) having both molecular terminals capped with hydrosilyl groups, 5.47 g of vinyltriethoxysilane $\{CH_2=CH-Si(OC_2H_5)_3\}$, and 0.83 g of dimethylvinylethoxysilane $\{CH_2=CH-Si(CH_3)_2(OC_2H_5)\}$. The components were uniformly mixed. After the mixture was combined with 39 mg of a 10% toluene solution of a complex of platinum and 1,3-dimethyl-1,1,3,3-tetravinyldisiloxane, the components were mixed and then stirred in the container while being heated to 100° C. After stirring at 100° C. for 2 hours, the pressure in the flask was reduced to 10 Torr, and the mixture was stirred for an additional 30 min. The mixture was then cooled to room temperature, the pressure was restored to atmospheric pressure, and the obtained viscous oily product was removed from the flask. Results of $^{29}$Si-NMR spectral analysis confirmed that the obtained product comprised polydiorganosiloxane mixture (III) consisting of 64 weight % of a polydimethylsiloxane of the chemical formula (12), 32 weight % of a polydimethylsiloxane of the chemical formula (13), and 4 weight % of a polydimethylsiloxane of the chemical formula (14). The obtained polydiorganosiloxane mixture (m) had a viscosity of 12,500 mPa·s.

EXAMPLE 1

A silicone rubber base compound was prepared by mixing 100 parts by weight of polydiorganosiloxane mixture (I) obtained in Synthesis Example 1 with 12 parts by weight of a fumed silica surface-treated with dimethyldimethoxysilane and hexamethyldisilazane and having a BET specific surface area of 130 m²/g. The obtained silicone rubber base compound was combined with 4.5 g of a methyltrimethoxysilane, 3 parts by weight of tetra (t-butoxy) titanium, 0.5 parts by weight of a reaction mixture prepared from: γ-aminopropyltrimethoxysilane and γ-glycidoxypropyltrimethoxysilane (after γ-aminopropyltrimethoxysilane and γ-glycidoxypropyltrimethoxysilane being mixed in a 1:2 mole ratio, the mixture was retained intact for four weeks at 25° C. and 50% humidity), and 0.3 parts by weight of a hindered-amine type light stabilizer {a product of Asahi Denka Kogyo K.K.; trademark "Adekastab LA-67"; a product of condensation reaction between 2,2,6,6-tetramethyl-4-piperidynol, tridecyl alcohol, and 1,2,3,4-butane tetracarboxylic acid}. The components were mixed to a uniform state under conditions isolated from moisture producing a room-temperature-curable silicone rubber composition. Initial adhesive force and bonding durability of the obtained room-temperature-curable composition were measured. Values of modulus of elasticity at 50% stretching (50% modulus) are shown in Table 1 given below.

EXAMPLE 2

A room-temperature-curable silicone-rubber composition was prepared by the same method as in Example 1, with the exception that 100 parts by weight of polydiorganosiloxane mixture (II) obtained in Synthesis Example 2 were used instead of 100 parts by weight of polydiorganosiloxane mixture (I). Characteristics of the obtained room-temperature-curable silicone-rubber composition were measured in the same manner as in Example 1. The results of the measurements are shown in Table 1.

EXAMPLE 3

A room-temperature-curable silicone-rubber composition was prepared by the same method as in Example 1, with the exception that 100 parts by weight of polydiorganosiloxane mixture (III) obtained in Synthesis Example 3 were used instead of polydiorganosiloxane mixture (I). Characteristics of the obtained room-temperature-curable silicone-rubber composition were measured in the same manner as in Example 1. The results of the measurements are shown in Table 1.

COMPARATIVE EXAMPLE 1

A room-temperature-curable silicone-rubber composition was prepared by the same method as in Example 1, with the exception that 100 parts by weight of polydimethylsiloxane represented by the chemical formula (5) were used instead of 100 parts by weight of polydiorganosiloxane mixture (I). Characteristics of the obtained room-temperature-curable silicone-rubber composition were measured in the same manner as in Example 1. The results of the measurements are shown in Table 1.

COMPARATIVE EXAMPLE 2

A room-temperature-curable silicone-rubber composition was prepared by the same method as in Example 1, with the exception that 70 parts by weight of polydimethylsiloxane represented by the chemical formula (5) and 30 parts by weight of a 100 mPa·s viscosity polydimethylsiloxane having both molecular terminals capped with trimethylsiloxy groups were used instead of polydiorganosiloxane mixture (I). Characteristics of the obtained room-temperature-curable silicone-rubber composition were measured in the same manner as in Example 1. The results of the measurements are shown in Table 1.

COMPARATIVE EXAMPLE 3

A room-temperature-curable silicone-rubber composition was prepared by the same method as in Example 3 with the exception that 100 parts by weight of a polydimethylsiloxane of the chemical formula (12) were used instead of polydiorganosiloxane mixture (III). Characteristics of the obtained room-temperature-curable silicone-rubber composition were measured in the same manner as in Example 1. The results of the measurements are shown in Table 1.

TABLE 1

| Duration of Exposure to Ultraviolet Radiation | Examples | | | Comparative Examples | | |
|---|---|---|---|---|---|---|
| | 1 | 2 | 3 | 1 | 2 | 3 |
| Initial (0 hours) | ◯ | ◯ | ◯ | ◯ | ◯ | ◯ |
| 1000 hours | ◯ | ◯ | ◯ | ◯ | ◯ | ◯ |
| 2000 hours | ◯ | ◯ | ◯ | ◯ | ◯ | ◯ |
| 3000 hours | ◯ | ◯ | ◯ | ◯ | X | Δ |
| 5000 hours | ◯ | ◯ | ◯ | Δ | X | X |
| 50% Modulus (MPa) | 0.4 | 0.4 | 0.5 | 0.7 | 0.4 | 0.9 |

Examples are now provided in relation to a further embodiment of the invention wherein when $R^4$ is $-OSiR^2_3$, Y is oxygen or a divalent hydrocarbon group, Z is a divalent hydrocarbon group, $R^7$ is $R^2$ and q is 0, 1 or 2.

SYNTHESIS EXAMPLE 4

Polydiorganosiloxane Mixture (V)

A flask equipped with a stirrer was filled with 500 g of polydimethylsiloxane of the chemical formula (24) having both molecular terminals capped with hydrosilyl groups, 2.88 g of vinyltriethoxysilane $\{CH_2=CH-Si\ (OC_2H_5)_3\}$ and 0.54 g of vinyltris(trimethylsiloxysilane) $\{CH_2=CH-Si\{OSi(CH_3)_3\}_3\}$. The components were uniformly mixed. After the mixture was combined with 39 mg of a 10% toluene solution of a complex of platinum and 1,3-divinyl-1,1,3,3-tetramethyldisiloxane, it was stirred in the container while being heated to 100° C. After stirring this mixture at 100° C. for 1 hour, the pressure in the flask was reduced to 10 Torr and the mixture was stirred for additional 30 min. The mixture was then cooled to room temperature, the pressure was restored to the atmospheric pressure, and the obtained viscous oily product was removed from the flask. Results of $^{29}$Si-NMR spectral analysis confirmed that the obtained reaction product comprising polydiorganosiloxane mixture (V) consisting of 81 wt. % of a polydimethylsiloxane of the chemical formula (21), 18 wt. % by weight of a polydimethylsiloxane of the chemical formula (22), and 1 wt. % of a polydimethylsiloxane of the chemical formula (23). The obtained polydiorganosiloxane mixture (V) had a viscosity of 60,000 mPa·s.

SYNTHESIS EXAMPLE 5

Polydiorganosiloxane Mixture (VI)

A flask equipped with a stirrer was filled with 500 g of a polydimethylmethylphenylsiloxane expressed by the chemical formula (29) having both molecular terminals capped with hydrosilyl groups, 1.15 g of a vinylmethyldimethoxysilane $\{CH_2=CH-Si(CH_3)(OCH_3)_2\}$ and 0.65 g of $\{CH_2=CH-Si(CH_3)_2\{OSi\ (CH_3)_3\}\}$. The components were uniformly mixed. After additionally mixing with 39 mg of a 10% toluene solution of a complex of platinum and 1,3-dimethyl-1,1,3,3-tetravinyldisiloxane, the components were stirred in the container while being heated to 100° C. After stirring at 100° C. for 2 hours, the pressure in the flask was reduced to 10 Torr, and the mixture was stirred for additional 30 min. The mixture was then cooled to room temperature, the pressure was restored to atmospheric pressure, and the obtained viscous oily product was removed from the flask. Results of $^{29}$Si-NMR spectral analysis confirmed that the obtained reaction product comprised polydiorganosiloxane mixture (VI) consisting of 49 wt. % of a polydimethylmethylphenylsiloxane of the chemical formula (26), 42 wt. % of a polydimethylmethylphenylsiloxane of the chemical formula (27), and 9 wt. % of a polydimethylmethylphenylsiloxane of the chemical formula (28). The obtained polydiorganosiloxane mixture (VI) had a viscosity of 100,000 mPa·s.

EXAMPLE 4

A silicone rubber base compound was prepared by mixing 100 parts by weight of polydiorganosiloxane mixture (V) obtained in Synthesis Example 4 with 12 parts by weight of a fumed silica surface-treated with dimethyldimethoxysilane and hexamethyldisilazane and having a BET specific surface area of 130 m$^2$/g. The obtained silicone rubber base compound was combined with 4.5 g of methyltrimethoxysilane, 3 parts by weight of tetra (t-butoxy) titanium, 0.5 parts by weight of a reaction mixture prepared from γ-aminopropyltrimethoxysilane and γ-glycidoxypropyltrimethoxysilane (after γ-aminopropyltrimethoxysilane and γ-glycidoxypropyltrimethoxysilane were mixed in a 1:2 mole ratio and the mixture was held for four weeks at 25° C. and 50% humidity), and 0.3 parts by weight of a hindered-amine type light stabilizer (a product of Asahi Denka Kogyo K.K.; trademark "Adekastab LA-67"; a product of condensation reaction between 2,2,6,6-tetramethyl-4-piperidynol, tridecyl alcohol, and 1,2,3,4-butane tetracarboxylic acid). The components were mixed to a uniform state under conditions isolated from moisture to obtain a room-temperature-curable silicone rubber composition. Initial adhesive force and bonding durability of the obtained room-temperature-curable composition were measured. Values of modulus of elasticity at 50% stretching (50% modulus) were also measured. The results of these measurements are given in Table 2 below.

EXAMPLE 5

A room-temperature-curable silicone-rubber composition was prepared by the same method as in Example 4, with the exception that 100 parts by weight of polydiorganosiloxane mixture (VI) obtained in Synthesis Example 5 were used instead of 100 parts by weight of polydiorganosiloxane mixture (V). Characteristics of the obtained room-temperature-curable silicone-rubber composition were measured in the same manner as in Example 4. The results of the measurements are given in Table 2.

COMPARATIVE EXAMPLE 4

A room-temperature-curable silicone-rubber composition was prepared by the same method as in Example 4, with the exception that 100 parts by weight of polydimethylsiloxane of the chemical formula (21) were used instead of 100 parts by weight of polydiorganosiloxane mixture (V). Characteristics of the obtained room-temperature-curable silicone-rubber composition were measured in the same manner as in Example 4. The results of the measurements are given in Table 2.

COMPARATIVE EXAMPLE 5

A room-temperature-curable silicone-rubber composition was prepared by the same method as in Example 4, with the exception that 70 parts by weight of polydimethylsiloxane of the chemical formula (21) and 30 parts by weight of a 100 mPa·s viscosity polydimethylsiloxane having both molecular terminals capped with trimethylsiloxy groups were used instead of polydiorganosiloxane mixture (V). Characteristics of the obtained room-temperature-curable silicone-rubber composition were measured in the same manner as in Example 4. The results of the measurements are given in

TABLE 2

| Duration of Exposure to Ultraviolet Radiation | Examples | | Comparative Examples | |
|---|---|---|---|---|
| | 4 | 5 | 4 | 5 |
| Initial (0 hours) | ◯ | ◯ | ◯ | ◯ |
| 1000 hours | ◯ | ◯ | ◯ | ◯ |
| 2000 hours | ◯ | ◯ | ◯ | ◯ |
| 3000 hours | ◯ | ◯ | ◯ | X |

TABLE 2-continued

| Duration of Exposure to Ultraviolet Radiation | Examples | | Comparative Examples | |
|---|---|---|---|---|
| | 4 | 5 | 4 | 5 |
| 5000 hours | ○ | ○ | Δ | X |
| 50% Modulus (MPa) | 0.4 | 0.5 | 0.7 | 0.4 |

The invention claimed is:

1. A room-temperature-curable silicone rubber composition comprising
(A) 100 parts by weight of a mixture comprising:
(A-1) 20 to 95 wt. % of a polydiorganosiloxane represented by the following general formula

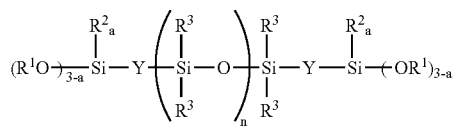

(A-2) 5 to 80 wt. % of a polydiorganosiloxane represented by formula

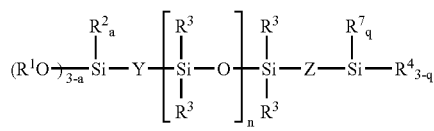

and
(A-3) 0 to 30 wt. % of a polydiorganosiloxane represented by formula

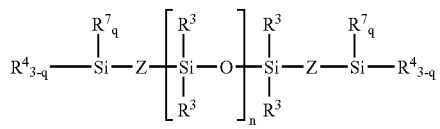

where $R^1$ and $R^2$ are independently selected from the group consisting of alkyl groups and alkoxyalkyl groups, $R^3$ is selected from the group consisting of alkyl groups, cycloalkyl groups, aryl groups, aralkyl groups, halogenated hydrocarbon groups, and the cyanoalkyl group, $R^4$ is independently selected from the group consisting of —$OSiR^2_3$, hydrogen and an alkoxy group, $R^7$ is $R^2$ or $R^3$, each Y and Z is independently selected from the group consisting of oxygen and a divalent hydrocarbon group, α is 0 or 1, q is 0, 1 or 2, and n is a number that provides the respective polyorganosiloxanes with a viscosity within the range of 20 to 1,000,000 mPa·s at 25° C., said polyorganosiloxanes being selected from the group of compounds wherein:
when $R^4$ is —$OSiR^2_3$, Y is independently selected from the group consisting of oxygen and a divalent hydrocarbon group, Z is a divalent hydrocarbon group, $R^7$ is $R^2$ and q is 0,1 or 2; and
when $R^4$ is independently selected from the group consisting of hydrogen and an alkoxy group, Y is independently selected from the group consisting of methylene or ethylene radicals, Z is independently selected from the group consisting of oxygen and a divalent hydrocarbon group, q is 2 and $R^7$ is $R^3$;
(B) 1 to 25 parts by weight of a material selected from the group consisting of (a) alkoxysilanes, (b) partial hydrolysis products of (a), and (c) condensation products of (b) thereof wherein (a) has the general formula $R^5_b Si(OR^6)_{4-b}$, where $R^5$ is a monovalent hydrocarbon group, $R^6$ is independently selected from the group consisting of an alkyl group and an alkoxy alkyl group, and b is 0 or 1; and
(C) 0.5 to 10 parts by weight of an organotitanium compound.

2. The room-temperature-curable silicone rubber composition of claim 1, where $R^1$ is independently selected from the group consisting of a methyl and ethyl radical.

3. The room-temperature-curable silicone rubber composition of claim 1 further comprising (D), 1 to 20 parts by weight of a fine silica powder.

4. The room-temperature-curable silicone rubber composition according to claim 1 further comprising (E), 0.1 to 5 parts by weight of an adhesion promoter.

5. The room-temperature-curable silicone rubber composition according to claim 1 further comprising (F), 0.1 to 5 parts by weight of a light stabilizer.

6. The room-temperature-curable silicone rubber composition of claim 1 wherein $R^2$ and $R^3$ are independently selected from the group consisting of methyl and ethyl radicals.

7. The room-temperature-curable silicone rubber composition of claim 1 wherein component (A-3) is present in an amount of from 0.5 to 15 wt %.

8. The room-temperature-curable silicone rubber composition of claim 1 comprising 2 to 10 parts by weight of component (B) for each 100 parts by weight of component (A).

9. The room-temperature-curable silicone rubber composition of claim 1 comprising 1 to 5 parts by weight of component (C) per each 100 parts by weight of component (A).

10. The room-temperature-curable silicone rubber composition of claim 1 wherein $R^4$ is independently selected from the group consisting of hydrogen and an alkoxy group, Y is independently selected from the group consisting of methylene or ethylene radicals, q is 2, $R^7$ is $R^3$, and Z is oxygen.

11. The room-temperature-curable silicone rubber composition according to claim 10 wherein $R^4$ is hydrogen.

12. The room-temperature-curable silicone rubber composition according to claim 1 wherein $R^4$ is hydrogen.

13. A construction sealant prepared from the composition of claim 1.

14. The room-temperature-curable silicone rubber composition of claim 1 wherein $R^4$ is —$OSi R^2_3$, $R^7$ is $R^2$ and q is 0, 1 or 2, and each Y and Z is independently selected from the group consisting of oxygen, a methylene radical, and ethylene radical.

15. A room-temperature-curable silicone rubber composition comprising
(A) 100 parts by weight of a mixture comprising:
(A-1) 20 to 95 wt. % of a polydiorganosiloxane represented by the following general formula

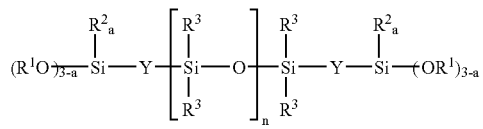

(A-2) 5 to 80 wt % of a polydiorganosiloxane represented by formula

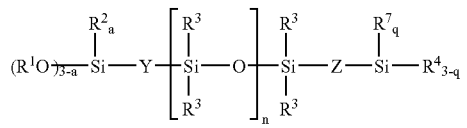

and
(A-3) 0 to 30 wt.% of a polydiorganosiloxane represented by formula

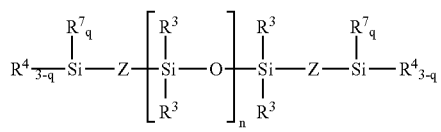

where $R^1$ and $R^2$ are independently selected from the group consisting of alkyl groups and alkoxyalkyl groups, $R^3$ is selected from the group consisting of alkyl groups, cycloalkyl groups, aryl groups, aralkyl groups, halogenated hydrocarbon groups, and the cyanoalkyl group, $R^4$ is independently selected from the group consisting of —OSi $R^2_3$, hydrogen and an alkoxy group, $R^7$ is $R^2$ or $R^3$, each Y and Z is independently selected from the group consisting of oxygen and a divalent hydrocarbon group, $\alpha$ is 0 or 1, q is 0, 1 or 2, and n is a number that provides the respective polyorganosiloxanes with a viscosity within the range of 20 to 1,000,000 mPa·s at 25° C., said polyorganosiloxanes being selected from the group of compounds wherein:
when $R^4$ is —OSi$R^2_3$, $R^7$ is $R^2$ and q is 0, 1 or 2; Y is independently selected from the group consisting of oxygen, a methylene radical, and ethylene radical; and Z is a divalent hydrocarbon group; and
when $R^4$ is independently selected from the group consisting of hydrogen and an alkoxy group, Y is independently selected from the group consisting of oxygen and a divalent hydrocarbon group, Z is independently selected from the group consisting of oxygen and a divalent hydrocarbon group, q is 2 and $R^7$ is $R^3$;
(B) 1 to 25 parts by weight of a material selected from the group consisting of (a) alkoxysilanes, (b) partial hydrolysis products of (a), and (c) condensation products of (b) thereof wherein (a) has the general formula $R^5_b Si(OR^6)_{4-b}$,
where $R^5$ is a monovalent hydrocarbon group, $R^6$ is independently selected from the group consisting of an alkyl group and an alkoxy alkyl group, and b is 0 or 1; and
(C) 0.5 to 10 parts by weight of an organotitanium compound.

16. The room-temperature-curable silicone rubber composition according to claim 15 wherein when $R^4$ is independently selected from the group consisting of hydrogen and an alkoxy group, Y is independently selected from the group consisting of methylene or ethylene radicals, Z is independently selected from the group consisting of oxygen and a divalent hydrocarbon group, q is 2 and $R^7$ is $R^3$.

* * * * *

UNITED STATES PATENT AND TRADEMARK OFFICE
CERTIFICATE OF CORRECTION

PATENT NO.         : 7,271,233 B2
APPLICATION NO.    : 10/477156
DATED              : September 18, 2007
INVENTOR(S)        : Makoto Yoshitake et al.

It is certified that error appears in the above-identified patent and that said Letters Patent is hereby corrected as shown below:

Column 19, line 56 Claim 1, after "group," delete [α] and insert therein -- a --.

Column 22, line 4 Claim 15, after "group," delete [α] and insert therein -- a --.

Signed and Sealed this

Twentieth Day of May, 2008

JON W. DUDAS
*Director of the United States Patent and Trademark Office*